United States Patent [19]
Vos

[11] Patent Number: 5,615,119
[45] Date of Patent: Mar. 25, 1997

[54] FAULT TOLERANT AUTOMATIC CONTROL SYSTEM UTILIZING ANALYTIC REDUNDANCY

[75] Inventor: David W. Vos, Boston, Mass.

[73] Assignee: Aurora Flight Sciences Corporation, Manassas, Va.

[21] Appl. No.: 477,500

[22] Filed: Jun. 7, 1995

[51] Int. Cl.$^6$ .................................................. G06F 165/00
[52] U.S. Cl. .............................. 364/424.013; 364/424.34; 244/194
[58] Field of Search ................................ 364/433, 434, 364/424.03, 424.04, 184, 187; 318/563, 564; 244/194, 75 R; 371/7, 11.1, 67.1

[56] References Cited

U.S. PATENT DOCUMENTS

| | | | |
|---|---|---|---|
| 4,644,538 | 2/1987 | Cooper et al. | 364/434 |
| 4,649,484 | 3/1987 | Herzog et al. | 364/434 |
| 5,274,554 | 12/1993 | Takats et al. | 364/424.03 |
| 5,289,377 | 2/1994 | Yokote et al. | 364/424.04 |
| 5,297,052 | 3/1994 | McIntyre et al. | 364/434 |
| 5,493,497 | 2/1996 | Buus | 364/434 |

OTHER PUBLICATIONS

Textbook entitled "Aircraft Dynamics And Automatic Control", chapter 4 entitled Elementary Theory of Nonlinear Feedback For Single–Input Single–Output Systems.
"Detecting Changes In Signals And Systems—A Survey" by Michele Basseville.
Textbook entitled "Nonlinear Dynamic Control Systems" chapter 5 entitled State Space Transformation And Feedback.
Phd Thesis of David Voss entitled "Nonlinear Control Of An Autonomous Unicycle Robot: Practical Issues".
"A Geometric Approach to the Synthesis Of Failure Detection Filters", by Mohammad–Ali Massoumnia.
"Application of Nonlinear Transformations To Automatic Flight Control" by G. Meyer, R. Su, and L. R. Hunt.
"Global Transformations of Nonlinear Systems" by L. R. Hunt et al.

*Primary Examiner*—Gary Chin
*Attorney, Agent, or Firm*—Fitzpatrick, Cella, Harper & Scinto

[57] ABSTRACT

Method and apparatus for a fault tolerant automatic control system for a dynamic device having a sensor and a predetermined control algorithm include structure and steps for receiving a status signal from the sensor. Structure and steps are provided for transforming the sensor status signal and a predetermined reference signal into a linear time invariant coordinate system, generating a sensor estimate in the linear time invariant coordinate system based on the transformed sensor status signal and the transformed reference signal, transforming the sensor estimate into a physical coordinate system, detecting an error in the sensor status signal based on a comparison of the transformed sensor estimate and the sensor status signal, and reconfiguring the predetermined control algorithm based on the detected error. Preferably, the apparatus and method are implemented in an aircraft flight control system capable of detecting an aircraft sensor fault and reconfiguring the flight control program such that flight control surface actuators are commanded by ignoring or mitigating the failed sensor.

20 Claims, 5 Drawing Sheets

FAULT TOLERANT AUTOMATIC CONTROL SYSTEM UTILIZING ANALYTIC REDUNDANCY

BACKGROUND OF THE INVENTION

I. Field of the Invention

The present invention relates to a fault tolerant automatic control system for a dynamic device (e.g. an airplane), wherein the fault tolerant control system utilizes analytic redundancy. More particularly, the present invention relates to a fault tolerant control system including (i) a coordinate transforming diffeomorphism and (ii) a feedback control law (algorithm), which produce a control system model that is linear time invariant (the feedback control law which renders the control system model linear invariant is hereinafter termed "a feedback LTI'ing control law") so that sensor/actuator failures are easily identified and the automatic control algorithm may be reconfigured based on the detected failures. For example, in the field of automatic flight controls, a vertical gyro sensor failure may be easily identified by reference to the transformed system model, and the automatic flight control algorithm may be executed while disregarding the vertical gyro sensor output, thus reconfiguring the flight control algorithm for safe operation. In general, the invention pertains to the automatic control of parameter-dependent dynamic systems (such as an aircraft in flight) in the face of a failure of any one of the actuators or sensors of the control system. In particular, the fault tolerant automatic control system is capable of performing the functions of automatic failure detection and control system reconfiguration for a system whose dynamic behavior depends on the parameters of the system, such as an airplane dependent on air speed, altitude, etc.

II. Related Art

Many aircraft crashes could have been prevented or minimized if the pilots (or autopilots) were able to identify the nature of an aircraft component failure and to properly reconfigure the aircraft controls to overcome the detected failure. The crash of a United Airlines DC-10 near Sioux City on Jul. 19, 1989 is an example of such control system reconfiguration. A tail engine fan disk failure severed all three hydraulic control systems, damaging the rudder and leaving the pilots with only engine throttle control. By effectively reconfiguring their controls and using only the throttle as a control actuator, the pilots were able to guide the plane to a semi-controlled crash wherein only 111 of the 296 people on board were killed. Had the pilots not accomplished this control system reconfiguration, it is most likely that all aboard would have perished.

A similar circumstance occurred with the loss of a rear cargo door of an American Airlines DC-10 near Windsor, Ontario. Rapid decompression distorted the cabin floor, trapping elevator control cables. The highly-experienced captain of the aircraft had recognized the potential for pitch control by thrust in the tri-jet configuration and had practiced for just such an eventuality in a flight simulator. Faced with the real event, he recovered his aircraft with no casualties. An identical accident occurred on a Turkish aircraft near Paris in 1974 which was a total loss. The captain of the Turkish aircraft did not recognize and apply control system reconfiguration. However, the ability to reconfigure the control system and save the aircraft should not be dependent solely on the experience of the pilot.

Another approach to flight control system fault detection and avoidance involves hardware redundancy. For example, by having three identical flight control components, voting among the components may yield a simple and reliable means of selecting the functional components and ignoring the failed components. However, hardware redundancy is expensive and requires much additional lift, and reduce available payload, volume, and weight. For unmanned air vehicles (UAVs), and for general aviation aircraft, such hardware redundancy cannot be afforded.

In addition, many other applications cannot afford the cost, size, and weight which accompanies hardware redundancy. For example, multi-link robotic manipulators exhibit dynamic behavior dependent on link configuration. The dynamic response with the links fully extended will be, for example, different from the case where all links are retracted. For manipulators, the parameters upon which the dynamics depend are link configuration. The need for compactness and the environment in which manipulators are used do not permit the necessary real estate for including multiply-redundant hardware.

As previously discussed, an important issue is the parameter-dependent nature of most control systems. For instance, an aircraft flying at steady speed and altitude is an example of a linear time invariant system since the dynamic behavior of the aircraft in response to small disturbances about this operating condition may be well described by a mathematical model which is linear and has constant parameters. Aircraft, however, typically operate over a large range in parameters such as altitude, speed, mass, center of mass location, etc. A mathematical model of the aircraft dynamics must necessarily include the effects of these and other parameters in order to accurately describe the dynamic behavior of the aircraft due to external disturbances and control inputs for any combinations of these parameter values. Often, an adequate mathematical model in such a case is linear, but parameter dependent, with the parameters varying over wide ranges. As previously discussed, a multi-link robotic manipulator is another example in the class of linear parameter-dependent systems. Existing fault tolerant control systems which have good design and synthesis attributes are limited in application to linear time invariant systems, and are not directly applicable to the more common linear parameter-dependent systems.

What is needed then is an automatic control system which reliably and effectively detects a control component failure and reconfigures the control system algorithm to overcome or mitigate the detected component failure for systems whose dynamics are not necessarily LTI.

SUMMARY OF THE INVENTION

The present invention relates to apparatus and method for reliably and effectively detecting a control system component failure, and for reconfiguring the control system algorithm to overcome or mitigate the detected component failure. The present invention provides analytic redundancy by comparing measured system behavior with expected system behavior and detecting failures based on this comparison. After failure detection, the control system algorithm is reconfigured to ignore or compensate for the failed component.

According to a first aspect of the present invention, a fault tolerant control system for a dynamic device having a sensor and a predetermined control algorithm includes means for receiving a status signal from the sensor. Processing means are provided for (i) transforming the sensor status signal and a predetermined reference signal into a linear time invariant coordinate system, (ii) generating a sensor estimate in the linear time invariant coordinate system based on the transformed sensor status signal and the transformed reference signal, (iii) transforming the sensor estimate into a physical coordinate system, (iv) detecting an error in the sensor status signal based on the transformed sensor estimate and the sensor status signal, and (v) reconfiguring the predetermined control algorithm based on the detected error.

According to a further aspect of the present invention, a fault tolerant aircraft flight control system for detecting a failure in at least one of a flight control sensor and a flight control actuator, and for reconfiguring the flight control system to minimize the detected failure includes input means for receiving a status signal indicating status of at least one of a flight control sensor and a flight control actuator. A processor is provided for (i) comparing the received status signal to a predetermined flight control reference signal and providing a flight control adjustment signal based on the comparison, (ii) transforming the status signal, the reference signal, and the adjustment signal into a linear time invariant coordinate system, (iii) determining an expected response of the at least one of a flight control sensor and a flight control actuator based on the transformed signals in the linear time invariant coordinate system, and generating an expected response signal corresponding thereto, (iv) transforming the expected response signal from the linear time invariant coordinate system to a physical coordinate system, (v) comparing the transformed expected response signal to the received status signal and generating an error signal corresponding thereto, (vi) determining that a failure has occurred in the at least one of a flight control sensor and a flight control actuator based on the error signal, and (vii) generating a reconfigure signal to reconfigure the flight control system to minimize the effect of the detected failure.

According to a further aspect of the present invention, a fault tolerant process for a dynamic device having a sensor and a predetermined control algorithm includes the steps of (i) inputting a status signal from the sensor, (ii) transforming the sensor status signal and a predetermined reference signal into a linear time invariant coordinate system, (iii) generating a sensor estimate in the linear time invariant coordinate system based on the transformed sensor status signal and transformed reference signal, (iv) transforming the sensor estimate into a physical coordinate system, (v) detecting an error in the sensor status signal based on the transformed sensor estimate and the sensor status signal, and (vi) reconfiguring the predetermined control algorithm based on the detected error.

BRIEF DESCRIPTION OF THE DRAWINGS

The above-described advantages and features according to the present invention will be readily understood by reference to the following detailed description of the presently preferred embodiment taken in conjunction with the drawings in which.

DETAILED DESCRIPTION OF THE PRESENTLY PREFERRED EMBODIMENT

The present invention will be described with respect to an embodiment incorporated in an aircraft automatic flight control system for maintaining desired handling qualities and dynamic performance of the aircraft even in the event of sensor or actuator failure. However, the present invention is also applicable to other dynamic devices such as vehicles including automobiles, trains, robots; and to other dynamic devices requiring monitoring and control including internal combustion engines, wind and solar generators, etc.

Figure 1:
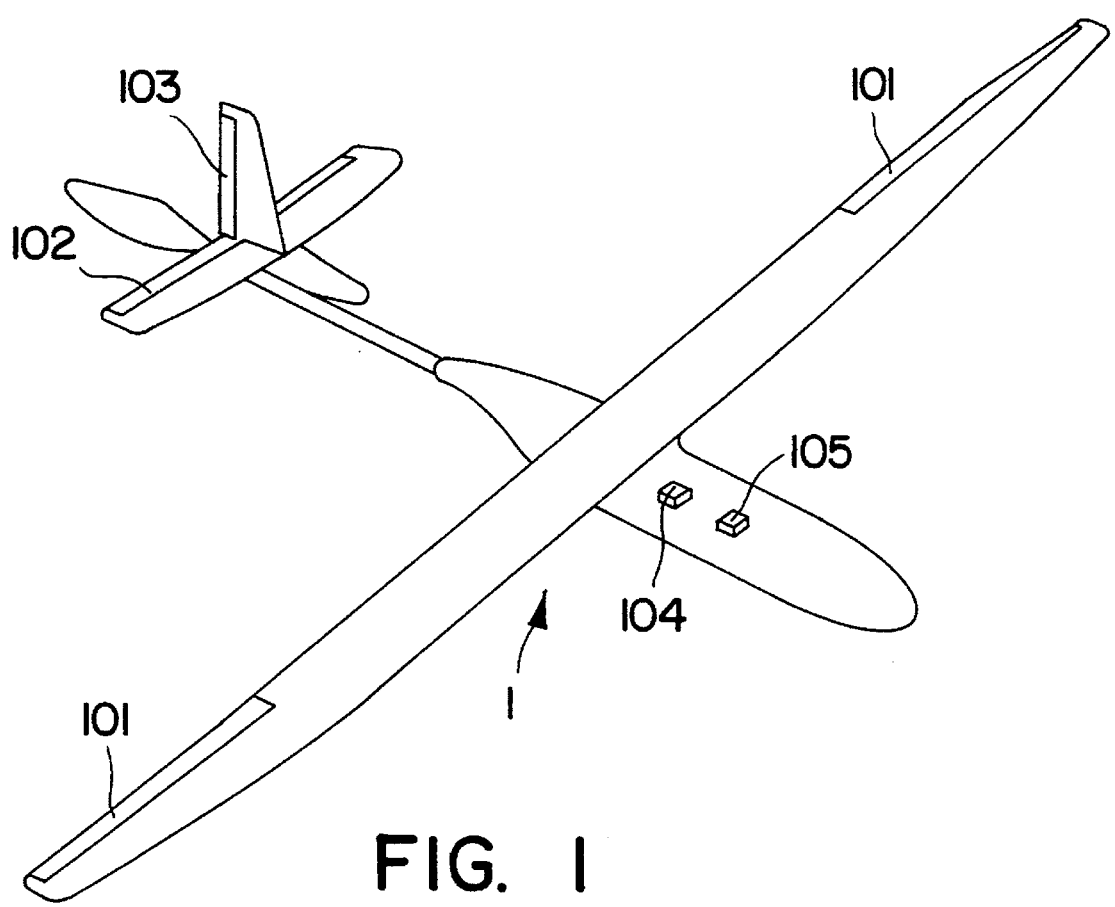
FIG. 1 is a perspective view of an aircraft incorporating the fault tolerant automatic control system according to the present invention.

FIG. 1 is a perspective view of a UAV aircraft 1 having flight control surfaces such as ailerons 101, elevator 102, and rudder 103. Each flight control surface has an actuator (not shown in FIG. 1) for controlling the corresponding surface to achieve controlled flight. Of course, other flight control actuators may be provided such as throttle, propeller, fuel mixture, elevator trim, brake, cowl flap, etc.

The actuators described above are controlled by a flight control computer 104 which outputs actuator control signals in accordance with a flight control algorithm (hereinafter termed flight control laws), in order to achieve controlled flight. The flight control computer 104 receives as inputs sensor status signals from the sensors disposed in sensor rack 105. Various aircraft performance sensors disposed about the aircraft monitor and provide signals to the sensor rack 105, which, in turn, provides the sensor signals to the flight control computer 104. For example, provided aircraft sensors may include: an altimeter; an airspeed probe; a vertical gyro for measuring roll and pitch attitudes; rate gyros for measuring roll, pitch, and yaw angular rates; a magnetometer for directional information; alpha-beta air probes for measuring angle of attack and sideslip angle; etc. Thus, using sensor status inputs and a flight control algorithm, the flight control computer 104 outputs actuator commands to control the various flight control surfaces to maintain stable flight.

Figure 2:
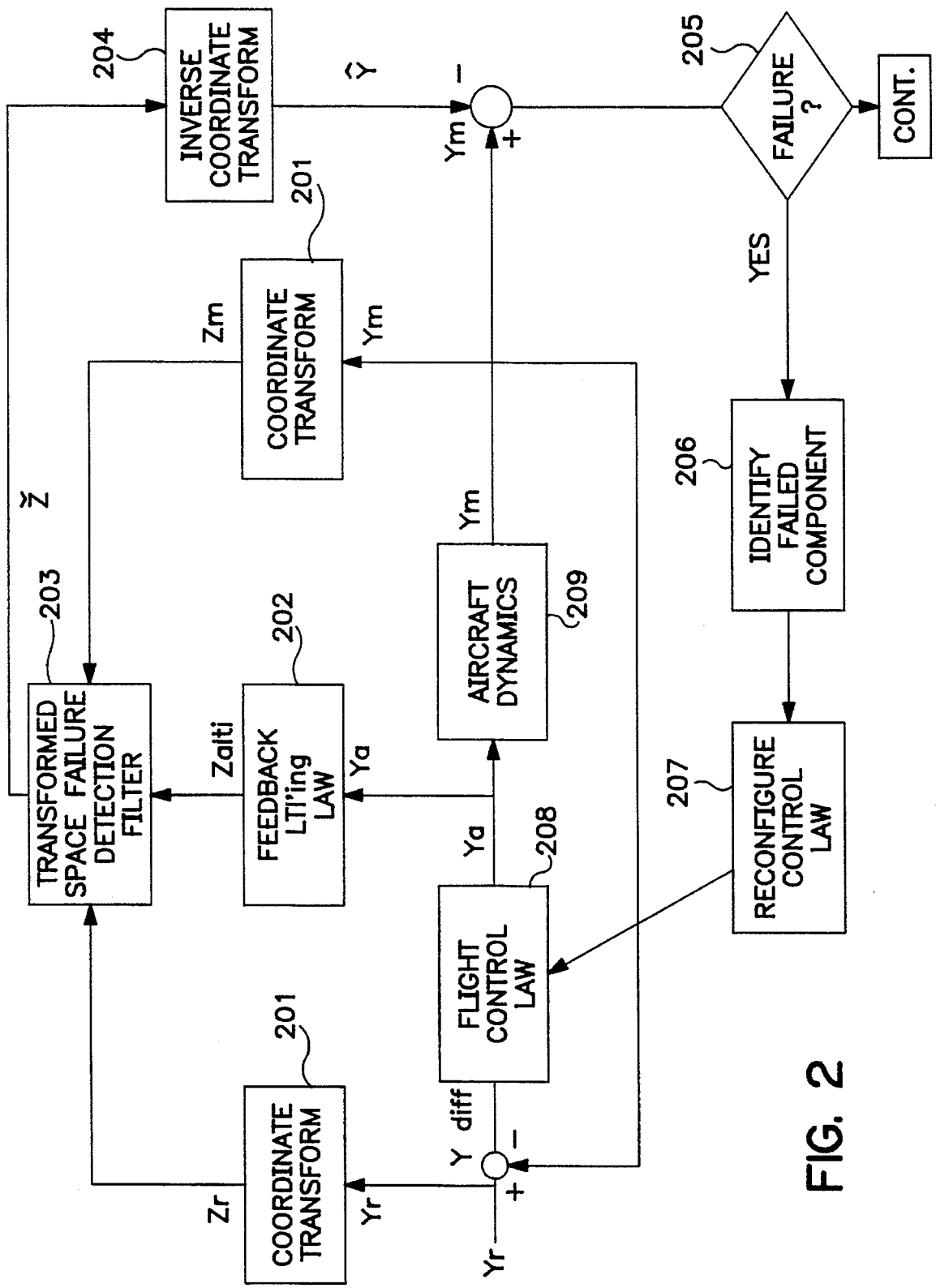
FIG. 2 is a functional block diagram describing the algorithm according to the present invention.

FIG. 2 is a functional block diagram for explaining the functional aspects according to the present invention. FIG. 2 represents an algorithm which provides sensor or actuator failure detection and isolation for an aircraft dynamic system whose dynamics vary with parameter value (vary over time), while taking account of the parameter dependence in both parameter value as well as the rate of change of parameter values of the dynamic system to be controlled. A mathematical model of the parameter-dependent dynamic system depicted in FIG. 1 is written in a physical coordinate system (hereinafter called a coordinate system in X-space) which can be represented on the physical dynamic system. In the case of an aircraft, a Cartesian axis system may have one axis disposed along the fuselage toward the nose, one axis disposed along the wing toward the right wingtip, and one axis disposed straight down from the center of mass, perpendicular to the plane incorporating the first two axes. Measurements via sensors placed along or about these axes provide information regarding for example, aircraft pitch, roll attitude, side slip, angle of attack, etc.

In FIG. 2 a reference signal Yr is an actuation input commanded by the ground-based UAV pilot. For example, where the pilot pushes the stick forward to increase airspeed, the actuation input of the stick moved forward is the reference signal Yr input to the flight control computer. The flight control computer subtracts from Yr the measured actuator or sensor signal Ym (e.g., the actual stick location), and determines a difference signal Ydiff. This difference signal is input to an appropriate one or ones of the flight control laws 208 (of the flight control algorithm) to determine an actual actuator command Ya which affects aircraft dynamics 209 by, for example, causing the elevator to move downward thereby decreasing pitch and thus increasing airspeed.

Flight control laws are typically a plurality of equations used to control flight in a predictable way. For example, a control law for controlling the UAV elevator may be simplified as:

$$\Delta e = G1(u_{ref} - u) + G2(\text{pitch attitude}) \tag{1}$$

where $\Delta e$ represents the change in elevator angle, $G_1$ and $G_2$ represent proportional gain to be applied to the elevator actuator, $u_{ref}$ represents the actuation reference signal in X-space, u represents the measured sensor output, and the pitch attitude is determined in accordance with the vertical gyro sensor. For example, if the elevator is actuated downward by the pilot, $u_{ref}$ will be lower than the measured u thus producing a negative G1 ($u_{ref} - u$) term. The pitch attitude initially is determined to be even, thus producing a very small G2 (pitch attitude) term. The elevator actuator command is thus the sum of G1 and G2, i.e., a large downward elevator actuator command. Flight control laws are well know to those of ordinary skill in flight and vehicle controls and will not be described in greater detail herein. Reference may be had to the text "AIRCRAFT DYNAMICS AND AUTOMATIC CONTROL", by McRuer, et al., Princeton University Press, 1973, incorporated herein by reference.

The output of flight control law 208 is an actuator command Ya which produces an effect on aircraft dynamics 209 which represents the dynamic behavior of the aircraft. The measured output Ym of aircraft dynamics 209 represents the physical dynamic response of the aircraft to the actuator input Ya. The interaction of the flight control law 208 and aircraft dynamics 209 is well known to those of ordinary skill in the art.

The present invention achieves fault detection and isolation and control law reconfiguration by transforming the various actuator signals into a linear time invariant coordinate system within which can be performed failure detection and isolation for dynamic systems whose parameters vary over time. That is, a failure detection filter may be implemented in so-called Z-space in which the system may be represented as linear time invariant and is independent of the dynamic system parameters. Thus, the failure detection filter is relatively simple in design and implementation, and is applicable to parameter-dependent dynamic systems whose parameters may vary in value over the full parameter envelope at arbitrary rates. Briefly, non-stationary aircraft flight dynamics equations are transformed into stationary linear equations in a general and systematic fashion. As a result, a set of constant coefficient differential equations is generated in Z-space for modeling the effects of failures in aircraft systems. Thus, linear time invariant failure detection algorithms may be directly applied to generate in Z-space a system model of expected aircraft dynamic behavior. This model is then compared to the sensor-measured system behavior to detect aircraft control failures and to reconfigure the aircraft controls to minimize the failure.

A coordinate transformation or diffeomorphism 201 is determined which transforms the physical coordinates (X-space) of the aircraft dynamic mathematical model to a new set of coordinates (Z-space). When combining this coordinate transform 201 with a feedback LTI'ing control law 202 which includes terms that account for both the current parameter values as well as the rate of change of the parameter values, it is then possible to mathematically treat the dynamic system as a linear time invariant system in Z-space. This methodology of feedback LTI-zation (by which the combination of diffeomorphism and feedback LTI-ing control yields the system mathematically linear time invariant) is an extension of a concept of input state feedback linearization [e.g., see Hunt, et al., "Global Transformations Of Non-Linear Systems", IEEE Transactions On Automatic Control, volume AC-28, no. 1, January, 1983; G. Meyer, et al., "Application Of Non-Linear Transformations To Automatic Flight Control," Automatica, volume 20, no. 1, pp. 103–7, Pergamon Pres. Ltd., 1984;—both incorporated herein by reference] to account for parameter rate of change terms, and is outlined in the PhD. thesis of the inventor, Dr. Vos, "Non-linear Control Of An Autonomous Unicycle Robot; Practical Issues," Massachusetts Institute of Technology, 1992—incorporated herein by reference]. The linear time invariant coordinate system allows design and synthesis of a single, parameter-independent, failure detection filter 203, which is then also applicable over the full range of the parameters of the dynamic system.

In order to define the diffeomorphism 201 and the feedback LTI law 202, assume the affine nonlinear parameter dependent system:

$$x = f(x,p) + g(x,p)u \tag{2}$$

where x is the parameter rate of change in X-space, f and g are functions of x-space parameters, and u is the x-space actuator or sensor term.

If the system is Involutive and Integrable, there exists a transformation (Diffeomorphism):

$$z = \Phi(x)$$

where z is the z-space coordinate, $\Phi$ is the diffeomorphism to be described below, and x is the x-spaced coordinate.+tm (3)

There also exists a Feedback LTI'ing Control Law:

$$u = \alpha(x,p) + \beta(x,p)\left\{ v - \frac{\partial \Phi}{\partial P} \dot{p} \right\} \tag{4}$$

where $\alpha$ and $\beta$ are terms which remove parameter dependence in Z-space. Operation of coordinate transform 201 and Feedback LTI'ing control law 202 yields the transformed space system LTI, in Controllable Canonical form:

$$\dot{Z} = \begin{bmatrix} 0 & 1 & 0 & \ldots & 0 \\ 0 & 0 & 1 & \ldots & 0 \\ . & & & & . \\ . & & & & . \\ 0 & 0 & 0 & \ldots & 1 \\ 0 & 0 & 0 & 0 & 0 \end{bmatrix} Z + \begin{bmatrix} 0 \\ 0 \\ 0 \\ . \\ . \\ . \\ 1 \end{bmatrix} v \quad (5)$$

i.e., the Z-space equations of motion where v is the Z-space actuator parameter.

The diffeomorphism is the system coordinates transformation, and is key to defining the transformed coordinates space in which the failure detection filter 203 is defined. Specifically, the coordinates transformation maps the physical coordinates (X-space) model into a set of coordinates in Z-space. One diffeomorphism exists for longitudinal aircraft dynamics, and one diffeomorphism exists for lateral aircraft dynamics.

In linear control theory terms, typical transfer functions can be written as follows:

$$\frac{\text{Output}}{\text{Input}} = \frac{\text{SystemZeros}}{\text{SystemPoles}} \quad (6)$$

where the poles are the characteristics of the system (e.g. for the longitudinal dynamics of an aircraft, this polynomial will include the short period and phugoid mode second-order dynamics), and the zeros indicate how the specific combination of input and measurement may obscure or, conversely, highlight specific internal dynamics of the system. Consider e.g. the airspeed response to elevator inputs. Very little information regarding pitch rate and angle of attack is apparent in the airspeed sensor data, but obviously changes in both pitch rate and alpha are occurring "internal" to the input-output view of the system. These internal characteristics are effectively masked from the viewer looking only at airspeed, by the zeros of the system.

The fundamental requirement for solving the diffeomorphism is to find a measurement combination (the measurement direction is not necessarily unique) of all the system states, which will not mask any information about the system dynamics, i.e. when looking at this specific measurement combination, information about all the internal dynamics will be available. This makes physical sense, since the transformed space equations of motion should include dynamics of the system. This transfer function will then have no zeros, and it becomes relatively mechanical to determine the diffeomorphism.

For the system:

$$\dot{\chi} = f(x) + g(x)u \quad (7)$$

where u is the system input, and x is the system state vector (x'=[airspeed, alpha pitch rate, pitch attitude], in the aircraft example).

In order to solve for a diffeomorphism, the conditions of integrability and involutivity (a nonlinear way of saying the chosen output must yield a system of full relative degree) must be satisfied. Solve for the output function, $\lambda(x)$, such that:

$$L_g \lambda(x) = L_{adf_g} \lambda(x) = L_{adf}n-2_g \lambda(x) = 0 \quad (8)$$

$$L_{adf}n-1 \lambda(x) \neq 0 \quad (9)$$

where $L_g \lambda(x)$ is the Lie derivative of $\lambda(x)$ along, or in the direction of g. For the linear parameter-dependent (LPD) systems we are concerned with, this becomes the following linear problem. Find the matrix C, such that for the LPD system:

$$\dot{x} = A(p)x + B(p)u \quad (10)$$

and the output:

$$y = Cx = \lambda(x) \quad (11)$$

where p is the parameter vector, the following are satisfied:

$$\begin{bmatrix} CB \\ CAB \\ CA^2B \\ . \\ . \\ . \\ CA^{n-1}B \end{bmatrix} = \begin{bmatrix} 0 \\ 0 \\ 0 \\ . \\ . \\ . \\ 1 \end{bmatrix} \quad (12)$$

$$C = [B \; AB \; A^2 b \ldots A^{n-1} \; B]^{-1} [0 \; 0 \; 0 \ldots 1] \quad (13)$$

It remains to solve for C, thus:

$$C = [B \; AB \; A^2 b \ldots A^{n-1} \; B]^{-1} [0 \; 0 \; 0 \ldots 1] \quad (13)$$

For the specific aircraft problem, the elements of C are dependent on density and dynamic pressure, and the solution is to define these coefficients in the form of 2-D lookup tables, as this offers an elegant implementation for computing the complex diffeomorphism coefficients.

Then, we get the diffeomorphism for the coordinates system transformation $z = \Phi x$ as:

$$\Phi x = \begin{bmatrix} C \\ CA \\ CA^2 \\ . \\ . \\ . \\ CA^{n-1} \end{bmatrix} \times (\Phi \text{ is the Diffeomorphism}) \quad (14)$$

With knowledge of the diffeomorphism coefficients, it is now possible to define the failure detection filter 203 in transformed coordinates, which will be the single fixed point design valid for the entire operating envelope of the aircraft.

The failure detection filter is initially designed at a nominal operating point in the flight envelope, using the model described in physical coordinates, and taking advantage of the insight gained by working in these coordinates. This design is then transformed into the z-space coordinates to determine the transformed space failure detection filter 203, which is then unchanged for all operating points in the flight envelope.

For the initial failure detection filter (FDF) in physical coordinates (X-space), whereby the matrix $H_x(p)$ is defined:

$$\dot{\chi} = (A(p)) - H_x(P))\chi + B(p)u \quad (15)$$

The transformed space FDF (in z-coordinates) is determined as:

$$\dot{z} = (A_z - H_z)z + B_z v \quad (16)$$

where:

$$H_z = \Phi H_x(p)\Phi^{-1} \quad (17)$$

and:

$$v = \Phi(n,:)Ax - \delta/\delta p(\Phi x)\dot{p} + \mu \quad (18)$$

This FDF is implemented in z-space, and is independent of parameters. Note that (1) $H_x(p)$ is designed at a nominal operating condition, which correlates to a specific set of values of the parameters of the system and (2) $H_z$ is independent of the system parameters and remains fixed for full system operation envelope i.e. this Single FDF design covers the entire envelope.

Returning to FIG. 2, the feedback LTI'ing law 202 when combined with the coordinate transform 201, yields the transformed spaced mathematical model linear time invariant. The failure detection filter 203 in these linear time invariant coordinates (Z-space) is depicted in block 203. The failure detection filter generates estimates of the Z-space state vector $\check{Z}$. Failure detection filters are readily known to those of ordinary skill in the art, for example, see Massoumnia, "A Geometric Approach To The Synthesis Of Failure Detection Filters," IEEE Transactions On Automatic Control, volume AC-31, no. 9, September 1986—incorporated herein by reference. The estimated Z-state vector is termed $\check{Z}$ and is provided to inverse coordinate transform 204 which is an inverse of diffeomorphism 201. This returns the estimated state vector into the physical coordinate system X- as the estimated signal $\hat{Y}$. This represents the expected behavior of the aircraft due to all control actuator inputs and the current state of the aircraft. This is the behavior (sensor output) which the failure detection filter 203 expects to see in the measurements of the actual aircraft dynamic behavior, namely the actual measurements which are obtained through the sensors and represented by signal Ym. The key to this algorithm is, fundamentally, that the failure detection filter does not require the system parameters to be constant, since the diffeomorphism and the feedback LTI'ing control law capture the effects of the varying operating conditions of the aircraft (e.g., different speeds, different altitudes, etc.). Each failure detection filter (there will be several running on board the flight control computer) is only designed for a single flight condition, but is valid for the entire operational envelope, since the diffeomorphism and feedback LTI'ing control law together accommodate the effects of the varying parameters (e.g., speed, altitude, mass, etc.).

The expected behavior $\hat{Y}$ is then subtracted from the measured signal Ym and the result is compared to a predetermined threshold $\tau$ in block 205. If the difference between the measured and expected behavior is above the predetermined threshold, a failure is indicated and the failure component will be identified in block 206. For example, where the vertical gyro indicates a large change in pitch, but the airspeed indicator does not vary, it may be determined that the vertical gyro component has failed.

After identifying the failed component, block 207 reconfigures the flight control law 208 to mitigate the failed component. For example, in the flight control law equation (1) discussed above, the pitch attitude term will be zeroed. Thus, in many cases, simply ignoring the failed sensor (multiply the relevant term by zero) gives adequate closed loop performance for continued operation. In other cases, for example of the vertical gyro, use of the integrated pitch rate for pitch attitude data, or integrated roll rate for roll attitude data gives good performance and allows continued operation.

Figure 3:
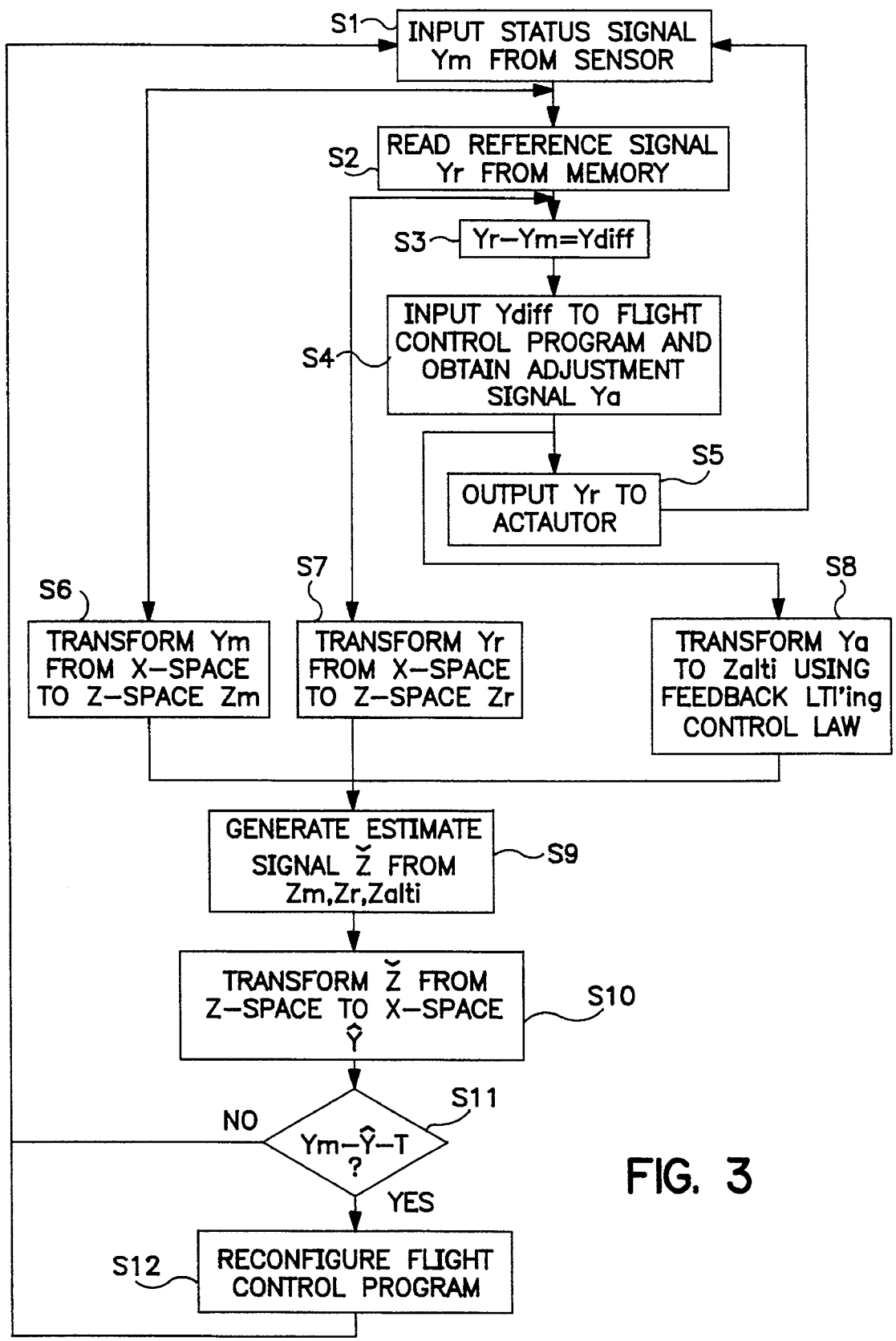
FIG. 3 is a flowchart showing the software flow carried out in the flight control computer of FIG. 3.

FIG. 3 is a flowchart depicting the software control carried out by the flight control computer 104. In step S1, the sensor status signal Ym is input from a sensor. In step S2, the reference signal Yr is read from the flight control computer RAM. In step S3, the difference signal Ydiff is obtained by subtracting Ym from Yr. In step S4, the difference signal Ydiff is input into the flight control law 208, and an appropriate actuator adjustment signal Ya is obtained therefrom. The signal Ya is output to the appropriate actuator(s) in step S5.

In step S6, the signal Ym is transformed from X-space to Z-space and output as signal Zm. In step S7, the signal Yr is transformed from X-space to Z-space and output as signal Zr. In step S8, the feedback LTI'ing control law converts the signal Ya into Z-space signal Zalti.

In step S9, the failure detection filter 203 is used to generate the estimate signal $\check{Z}$ from the signals Zn, Zr, and Zalti. In step S10, the signal $\check{Z}$ is transformed from Z-space to X-space as signal $\hat{Y}$.

In step S11, it is determined whether a failure exists by subtracting $\hat{Y}$ from Ym and determining whether that difference exceeds a predetermined threshold $\tau$. If the threshold is not exceeded, the software loops back to step S1 where a new status signal Ym is input. However, if a failure is indicated in step S11, the appropriate component is identified and the flight control law 208 is reconfigured in step S12. Accordingly, the failure is reliably detected and the flight control program is reconfigured to avoid or minimize the detected failure.

Figure 4:
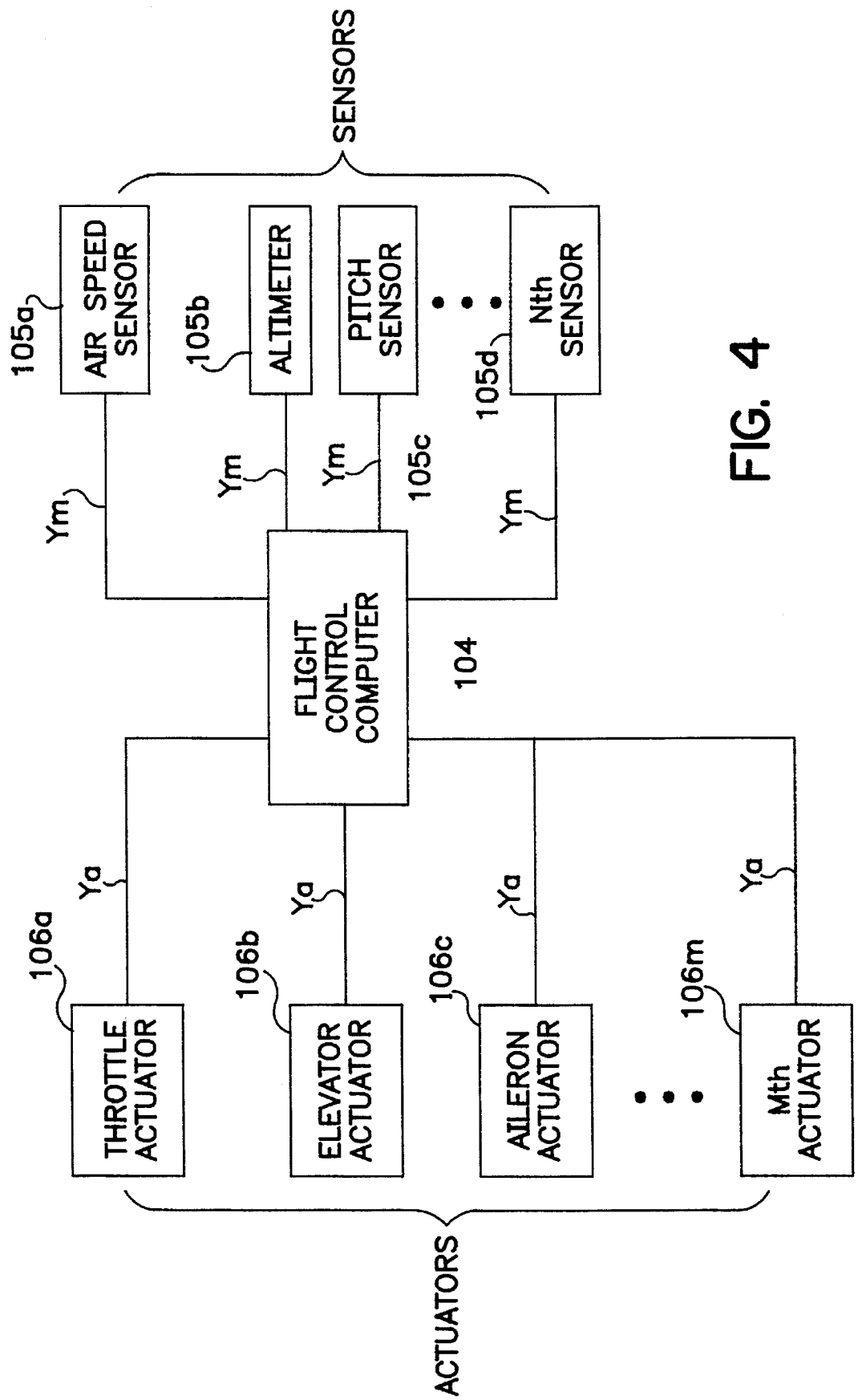
FIG. 4 is a block diagram of the flight control computer, sensors, and actuators, according to the FIG. 1 embodiments.

FIG. 4 is a block diagram showing the relationship between the various sensors, actuators, and the flight control computer. As can be seen, flight control computer 104 receives input from various sensors such as airspeed sensor 105a, altimeter 105b, pitch sensor 105c, and Nth sensor 105n. The various sensor inputs are inserted into the appropriate flight control laws 208 and output as actuators signals Ya to actuators 106 such as throttle actuator 106a, elevator actuator 106b, aileron actuator 106c, and Mth actuator 106m.

Figure 5:
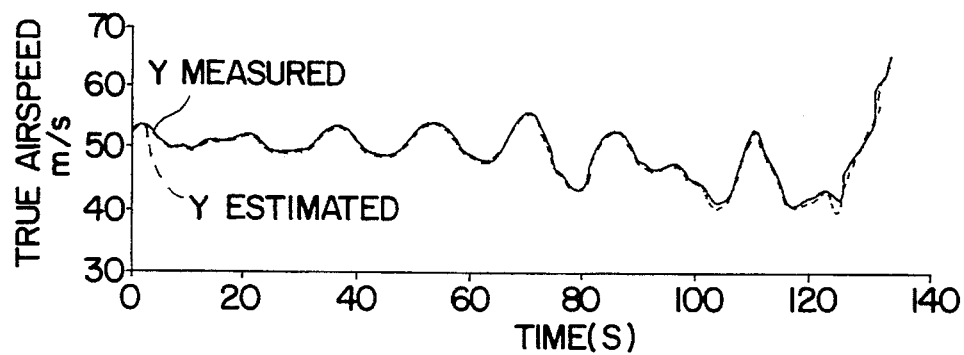
FIG. 5 is a graph showing an aircraft airspeed sensor output in the estimated airspeed sensor produced according to the present invention.

An example of the operation of the control system according to the present invention will now be described with respect to FIGS. 5, 6, 7, and 8. In 1994, a Perseus-A aircraft operated by Aurora Flight Sciences, Inc., of Manassas, Va. broke up at 33,000 feet over Edwards AFB when flying at 100 knots true airspeed. Analysis subsequently indicated that a vertical gyro had failed and the autopilot was driven to command control surface deflections beyond the performance envelope of the aircraft. Had the present invention been implemented in the flight control computer of the Perseus-A aircraft, this accident would have been avoided. FIG. 5 is a graph showing the true measured airspeed Ym of the Perseus-A aircraft in solid line. This actual data was fed into a flight control computer running the algorithm according to the present invention, and the estimated airspeed $\hat{Y}$ produced by the failure detection filter according to the present invention is shown in dashed line. It is readily apparent that the estimate produced according to the present invention is almost identical to the actual measured airspeed.

Figure 6:
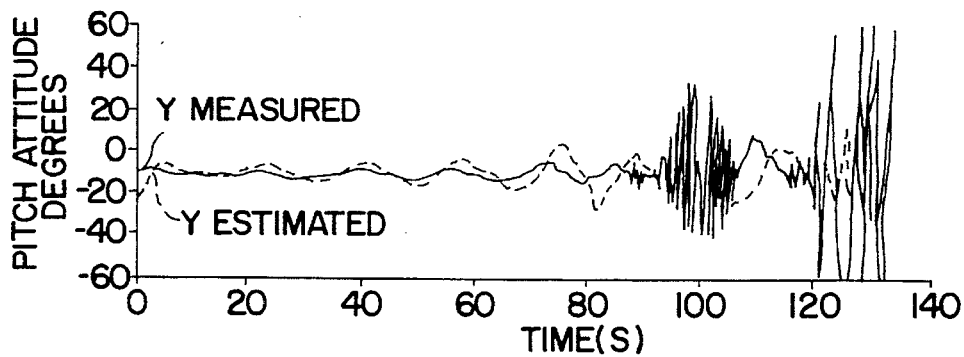
FIG. 6 is a graph showing an aircraft pitch attitude sensor output and an estimated pitch sensor output produced according to the present invention.
Figure 7:
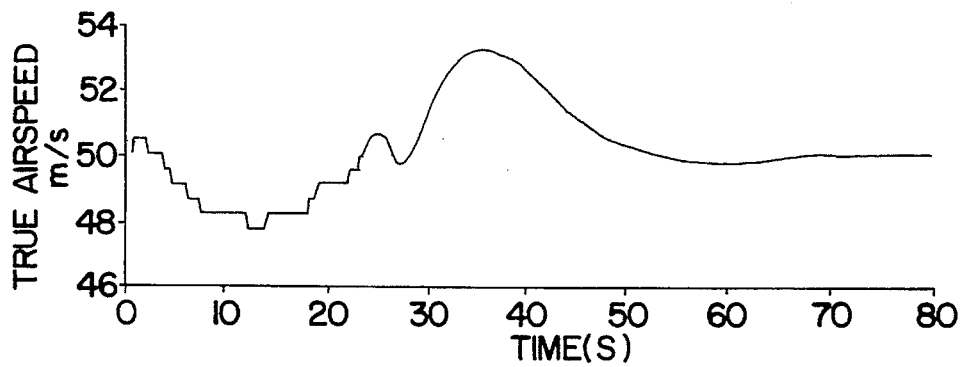
FIG. 7 is a graph showing an aircraft airspeed sensor output and a simulated output after flight control reconfiguration.
Figure 8:
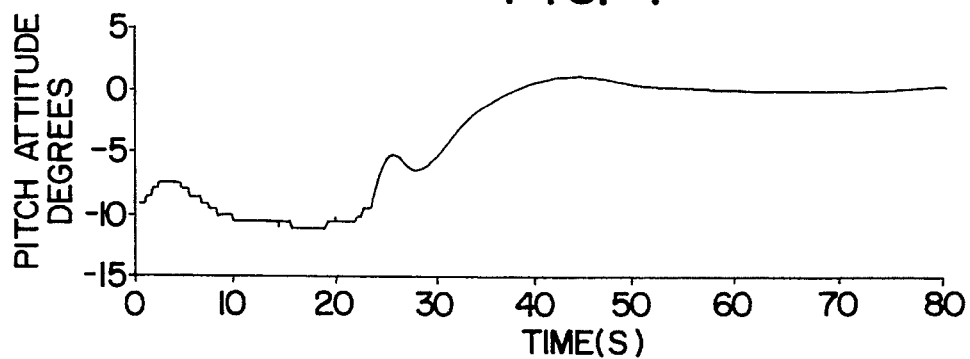
FIG. 8 is a graph showing an aircraft pitch attitude sensor output and a simulated pitch attitude sensor output after flight control system reconfiguration according to the present invention.

FIG. 6 depicts the pitch attitude of the Perseus-A aircraft (as measured by the vertical gyro) showing both the actual measured pitch attitude Ym in solid line, and the estimated pitch attitude $\hat{Y}$ shown in dashed line. While FIG. 5 shows that the airspeed sensor is in good working order, the same cannot be said for the pitch attitude data from the vertical gyro. Ignoring the start-up transient of the failure detection filter at time t=0, the first substantial discrepancy between the estimated pitch data and the telemetry data occurs at about t=20 seconds. This discrepancy persists all the way to time t=133 seconds at which point the aircraft breaks up. The algorithm according to the present invention first identified the problem in the pitch attitude sensor (vertical gyro) almost 2 minutes before the aircraft is lost. Note that where the sensor telemetry data is extremely unstable around t=100 seconds, the estimated data is not nearly so unstable-it is in fact smooth.

Had the present invention been installed in the Perseus-A aircraft, the control laws could have been reconfigured in a way to avoid aircraft loss. To show this, the data of FIGS. 5 and 6 was subject to the algorithm of FIG. 2 with the results depicted in FIGS. 7 and 8. At time t=23 seconds, the algorithm determines that the pitch attitude signal is faulty due to a vertical gyro failure. After t=23 seconds, the reconfigured control law ignores the vertical gyro signal and instead uses integral pitch rate data for attitude information in this control law. The pitch attitude and true airspeed immediately stabilize and controlled flight is continued. The aircraft can now be recovered with no loss.

Thus, according to the present invention, by transforming the system model into Z-space and generating estimated system data which is compared to actual system data, control component failures can be reliably and efficiently detected, and the control system can be reconfigured in a way to minimize the detected failure.

While the present invention has been described with what is presently considered to be the preferred embodiment, the invention is not limited thereto. For example, the invention may be applicable to any parameter-dependent dynamic systems such as automobiles, ships, spacecraft, trains, robots, internal combustion engines, etc. The scope of the appended claims is to be interpreted in accordance with all such structural and functional equivalents.

I claim:

1. A fault tolerant automatic control system for a dynamic device having a sensor and a predetermined control algorithm, comprising:

means for receiving a status signal from said sensor; and processing means for (i) transforming the sensor status signal and a predetermined reference signal into a linear time invariant coordinate system, (ii) generating a sensor estimate in the linear time invariant coordinate system based on the transformed sensor status signal and the transformed reference signal, (iii) transforming the sensor estimate into a physical coordinate system, (iv) detecting an error in the sensor status signal based on a comparison of the transformed sensor estimate and the sensor status signal, and (v) reconfiguring the predetermined control algorithm based on the detected error.

2. The system according to claim 1, wherein said processing means determines a difference signal corresponding to a difference between the sensor status signal and the predetermined reference signal.

3. A system according to claim 2, wherein said processing means inputs said difference signal into the control algorithm and produces an actuator adjustment signal therefrom.

4. A system according to claim 3, wherein said processing means transforms the sensor status signal and the predetermined reference signal into the linear time invariant coordinate system by applying a diffeomorphism transformation on the sensor status signal and the predetermined reference signal, and by applying a feedback LTI'ing control law to the actuator adjustment signal.

5. A system according to claim 4, wherein said processing means generates the system estimate based on the transformed sensor status signal, the transformed reference signal, and the actuator adjustment signal which has feedback LTI'ed.

6. A control system according to claim 1, wherein said processing means comprises an aircraft flight control computer and wherein said predetermined control algorithm comprises a flight control law.

7. A fault tolerant aircraft flight control system for detecting a failure in at least one of a flight control sensor and a flight control actuator, and for reconfiguring the flight control system to minimize the detected failure, comprising:

input means for receiving a status signal indicating a status of said at least one of a flight control sensor and a flight control actuator;

processing means for (i) comparing the received status signal to a predetermined flight control reference signal and providing a flight control adjustment signal based on the comparison, (ii) transforming the status signal, the reference signal, and the adjustment signal into a linear time invariant coordinate system, (iii) determining an expected response of the at least one of a flight control sensor and a flight control actuator based on the transformed signals in the linear time invariant coordinate system, and generating an expected response signal corresponding thereto, (iv) transforming the expected response signal from the linear time invariant coordinate system to a physical coordinate system, (v) comparing the transformed expected response signal to the received status signal and generating an error signal corresponding thereto, (vi) determining that a failure has occurred in the at least one of a flight control sensor and a flight control actuator based on the error signal, and (vii) generating a reconfigure signal to reconfigure the flight control system to minimize the detected failure; and output means for outputting a flight control adjustment signal to the at least one of a flight control sensor and a flight control actuator based on the reconfigured flight control system.

8. A system according to claim 7, wherein said processing means determines a difference between the received status signal and the predetermined flight control reference signal and outputs a difference signal corresponding thereto, said processing means inputting the difference signal to a predetermined flight control law to produce the flight control adjustment signal.

9. A system according to claim 8, wherein the processing means transforms the status signal, the reference signal, and the adjustment signal by applying a diffeomorphism transformation on the status signal and the reference signal, and by applying a feedback LTI'ing control law to the flight control adjustment signal.

10. A system according to claim 9, wherein one diffeomorphism is provided for longitudinal aircraft dynamics, and one diffeomorphism is provided for lateral aircraft dynamics.

11. A system according to claim 9, wherein the processing means identifies a failed component after comparing the transformed expected response signal to the received status signal and generating the error signal.

12. A system according to claim 7, wherein said processing means comprises a flight control computer processing one or more flight control laws, and wherein said flight control computer reconfigures the one or more flight control laws based on the reconfigure signal.

13. A system according to claim 7, wherein said processing means determines the expected response in the linear time invariant coordinate system in Z-space which is substantially independent of parameters of the system.

14. A method of fault tolerant automatic control for a dynamic device having a sensor and a predetermined control algorithm, comprising the steps of:

receiving a status signal from the sensor;

transforming the sensor status signal and a predetermined reference signal into a linear time invariant coordinate system;

generating a sensor estimate in the linear time invariant coordinate system based on the transformed sensor status signal and the transformed reference signal;

transforming the sensor estimate into a physical coordinate system;

detecting an error in the sensor status signal based on the transformed sensor estimate and the sensor status signal; and reconfiguring the predetermined control algorithm based on the detected error.

15. A method according to claim 14, wherein said dynamic device comprises an aircraft, the predetermined control algorithm comprises a flight control algorithm, and wherein the predetermined reference signal comprises a flight control law reference signal.

16. A method according to claim 14, further comprising the steps of:

comparing the received status signal to the predetermined reference signal and providing a difference signal based on the comparison;

subjecting the difference signal to the predetermined control algorithm to produce an actuation adjustment signal; and transforming the actuation adjustment signal into the linear time invariant coordinate system.

17. A method according to claim 16, wherein the step of generating a sensor estimate includes the step of generating the sensor estimate based on the transformed sensor status signal, the transformed reference signal, and the transformed adjustment signal.

18. A method according to claim 17, wherein the first transforming step comprises the step of subjecting the sensor status signal and the predetermined reference signal to a diffeomorphism transformation, and subjecting the actuation adjustment signal to a feedback LTI'ing control law.

19. A method according to claim 14, wherein the linear time invariant coordinate system is a Z-space system substantially independent of parameters of the system.

20. A method according to claim 14, further comprising the step of identifying a failed component based on the detected error.

* * * * *